US012508641B1

(12) United States Patent
Gao et al.

(10) Patent No.: US 12,508,641 B1
(45) Date of Patent: Dec. 30, 2025

(54) HEMMING APPARATUS

(71) Applicant: FCA US LLC, Auburn Hills, MI (US)

(72) Inventors: Hong Gao, Shanghai (CN); Chunmei Fan, Shanghai (CN); Xiaozhou Ziang, Shanghai (CN); Fanhui Zhang, Shanghai (CN); Hongyu Wang, Shanghai (CN)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 18/960,236

(22) Filed: Nov. 26, 2024

(51) Int. Cl.
*B21D 39/02* (2006.01)
*B21D 19/04* (2006.01)
*B25J 11/00* (2006.01)

(52) U.S. Cl.
CPC ......... *B21D 39/021* (2013.01); *B21D 19/043* (2013.01); *B21D 39/023* (2013.01); *B25J 11/005* (2013.01); *Y10T 29/49922* (2015.01)

(58) Field of Classification Search
CPC ................ B21D 39/023; B21D 19/043; Y10T 29/49922
See application file for complete search history.

(56) References Cited

U.S. PATENT DOCUMENTS

2005/0086989 A1* 4/2005 Holmgren ............ B21D 39/021 72/220
2005/0262912 A1* 12/2005 Toeniskoetter ...... B21D 39/023 72/220
2006/0225631 A1* 10/2006 Steed .................. B21D 39/023 112/141
2007/0006627 A1* 1/2007 Heringshausen .... B21D 19/043 72/220
2008/0307630 A1* 12/2008 Hasegawa ............ B21D 19/043 72/220
2011/0107807 A1* 5/2011 Sato ..................... B21D 39/023 72/220
2013/0276500 A1* 10/2013 Tsuda ................... B21D 39/023 72/252.5
2015/0033816 A1* 2/2015 Neelakandan ....... B21D 39/023 72/252.5
2019/0255586 A1* 8/2019 Kanaeda .............. B21D 39/023

FOREIGN PATENT DOCUMENTS

JP 05038535 A * 2/1993 ........... B21D 39/023
KR 10-2012-0000454 A 1/2012
WO WO-03004189 A1 * 1/2003 ........... B21D 19/043

* cited by examiner

*Primary Examiner* — Jermie E Cozart
(74) *Attorney, Agent, or Firm* — Jeremy J. Klobucar

(57) ABSTRACT

A hemming apparatus having a hemming die that includes a seat configured to support a first panel and a second panel relative to one another; a hemming bed positioned between the seat and an outer periphery of the hemming die; and a reference surface between the hemming bed and outer periphery of the hemming device, wherein a robot is configured to move the roller about the outer periphery of the hemming die in a manner where the roller simultaneously contacts each of a first terminal edge of the first panel and the reference surface to fold the first terminal edge of the first panel over a second terminal edge of the second panel to create a flange that secures the first panel to the second panel.

4 Claims, 4 Drawing Sheets

HEMMING APPARATUS

FIELD

The present disclosure relates to a hemming apparatus.

BACKGROUND

This section provides background information related to the present disclosure which is not necessarily prior art.

When making a body-in-white (BIW) for a vehicle, a hemming process may be used to join two panels together that may form a portion of a body of the vehicle. Example portions of the body of the vehicle that include two panels joined together by hemming include, for example, a vehicle door panel, a vehicle hood, and quarter panels of the vehicle. In the hemming joining process, an outer panel and an inner panel are set in a machining position relative to one another, and then a hemming device is used to fold a peripheral edge (e.g., flange) of the outer panel over a peripheral edge of the inner panel (i.e., form a metal "hem"). In general, the hemming process may include multiple passes of the hemming device to fully fold the peripheral edge of the outer panel over the peripheral edge of the inner panel. Further, the first of these passes is generally considered to be the most important in order to prevent wrinkles and/or cracks from being formed in the hem.

An example robot roller hemming system may include a robot that moves a hemming roller relative to the inner and outer panels that are mounted on a hemming die. In such a system, the hemming quality depends on how accurately the robot moves the hemming roller along the hemming work path and maintains the pressure direction and pressing force of the roller uniformly. If the robot and hemming rollers do not operate correctly along the hemming path, panel bending, wrinkling or external bending may occur, which is undesirable.

SUMMARY

This section provides a general summary of the disclosure, and is not a comprehensive disclosure of its full scope or all of its features.

According to a first aspect of the present disclosure, there is provided a hemming apparatus that includes a robot having a hemming attachment including a roller attached thereto, and a hemming die. The hemming die includes a seat configured to support a first panel and a second panel of a panel assembly relative to one another; a hemming bed positioned between the seat and an outer periphery of the hemming die, the hemming bed configured to support a first terminal edge of the first panel and a second terminal end of the second panel of the panel assembly relative to one another; and a reference surface between the hemming bed and outer periphery of the hemming device, wherein the robot is configured to move the roller about the outer periphery of the hemming die in a manner where the roller simultaneously contacts each of first terminal edge of the first panel and the reference surface to fold the first terminal edge of the first panel over the second terminal edge of the second panel to create a flange that secures the first panel to the second panel, and the simultaneous contact between the roller and each of the reference surface and the first terminal edge of the first panel guides the roller relative to the first terminal edge of the first panel when folding the first terminal edge over the second terminal edge.

According to the first aspect, an angle between the hemming bed and the reference surface lies in a range of about 110 degrees to about 130 degrees.

According to the first aspect, the angle between the hemming bed and the reference surface lies is about 120 degrees.

According to the first aspect, the roller include a cylindrical body having an end that radially narrows to form a chamfered surface.

According to the first aspect, the chamfered surface is configured to contact the reference surface.

According to a second aspect of the present disclosure, there is provided a hemming method that forms a flange that secures a first panel to a second panel to form a panel assembly for an automobile. The hemming method may include providing a hemming die including: a seat configured to support the first panel and the second panel of the panel assembly relative to one another; a hemming bed positioned between the seat and an outer periphery of the hemming die, the hemming bed configured to support a first terminal edge of the first panel and a second terminal end of the second panel of the panel assembly relative to one another; and a reference surface between the hemming bed and outer periphery of the hemming device. In addition, the method may include locating the first panel in the seat and then locating the second panel overtop the first panel such that the first terminal edge of the first panel is overlapped by the second terminal end of the second panel over the hemming bed; and moving a roller about the outer periphery of the hemming die in a manner where the roller simultaneously contacts each of first terminal edge of the first panel and the reference surface to fold the first terminal edge of the first panel over the second terminal edge of the second panel to create a flange that secures the first panel to the second panel, wherein the simultaneous contact between the roller and each of the reference surface and the first terminal edge of the first panel guides the roller relative to the first terminal edge of the first panel when folding the first terminal edge over the second terminal edge.

According to the second aspect, an angle between the hemming bed and the reference surface lies in a range of about 110 degrees to about 130 degrees.

According to the second aspect, the angle between the hemming bed and the reference surface lies is about 120 degrees.

According to the second aspect, the roller includes a cylindrical body having an end that radially narrows to form a chamfered surface.

According to the second aspect, the chamfered surface is configured to contact the reference surface.

According to the second aspect, the moving the roller about the outer periphery of the hemming die in a manner where the roller simultaneously contacts each of the first terminal edge of the first panel and the reference surface occurs during a first pass of the hemming method.

According to the second aspect, the method may also include conducting a second pass of moving the roller about the outer periphery of the hemming die, wherein during the second pass, the roller does not contact the reference surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
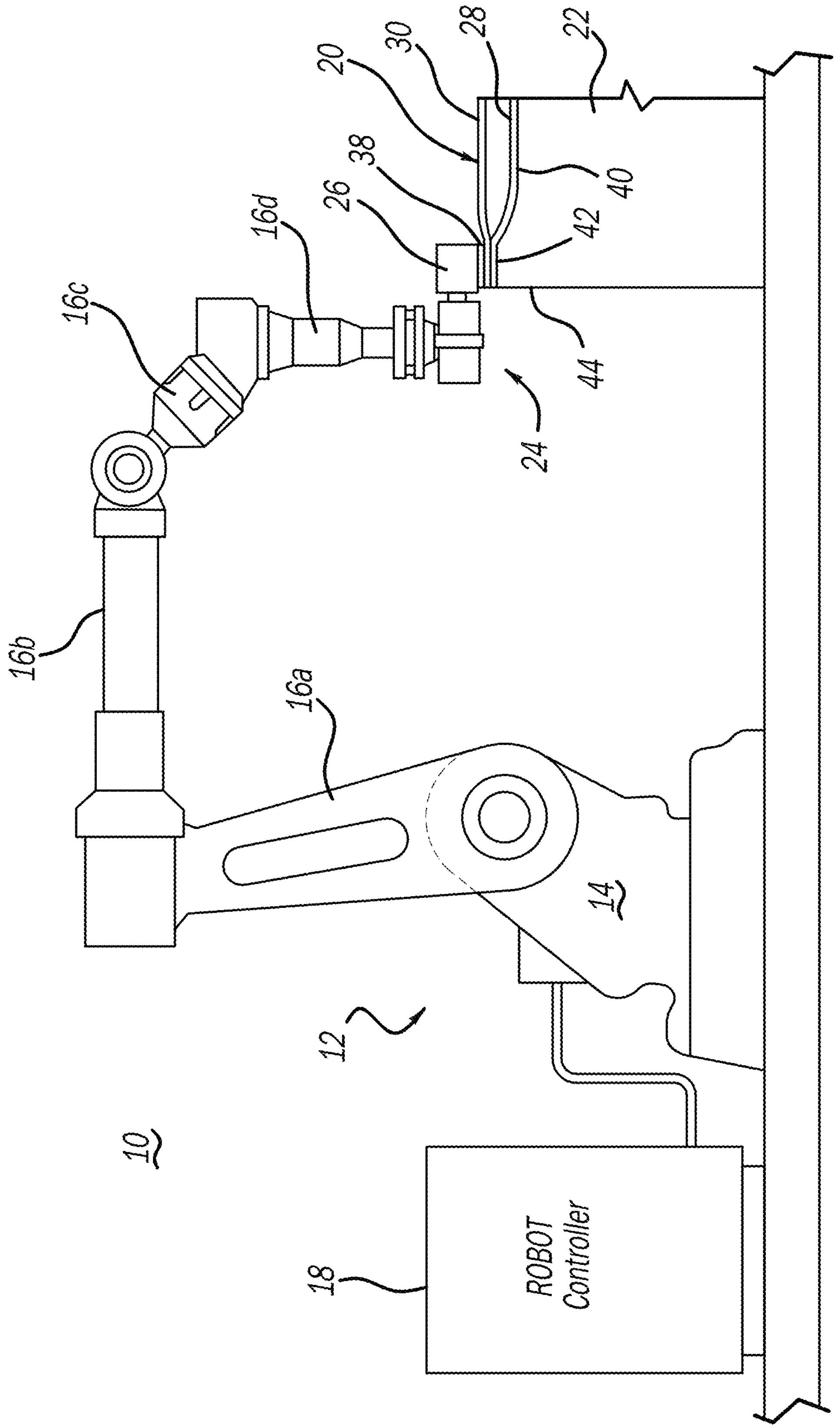
FIG. 1 is a perspective view of an example hemming system according to a principle of the present disclosure.

FIG. 1 illustrates an example hemming system 10 that may be used in connection with the teachings of the present disclosure. Hemming system 10 includes a robot 12 that may include a base 14 and a plurality of arms **16*a*, 16*b*, 16*c*, and 16*d* that move relative to the base 14 and to each other. Robot 12 may be, for example, a six-axis robot as is known in the art. A controller 18, which may be, for example, a computer is in communication and configured to control movement of robot 12 relative to a panel assembly 20 that is secured to a hemming die 22. A hemming roller attachment 24 having a roller 26 may be attached to arm 16*d***.

Figure 2:
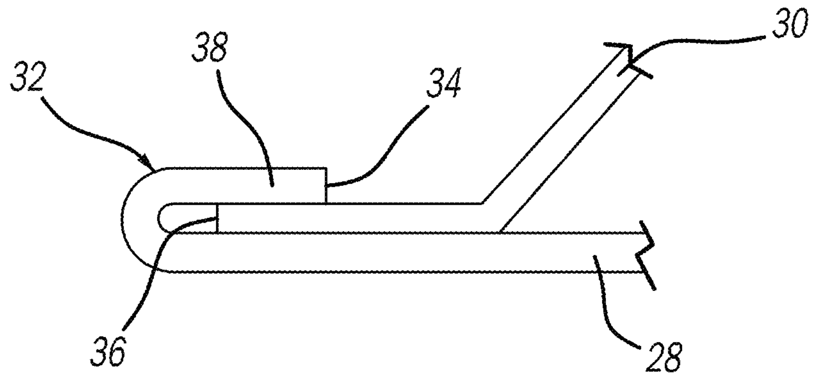
FIG. 2 is a cross-sectional view of an example hem that can be generated using the example hemming system illustrated in FIG. 1.

FIG. 2 illustrates panel assembly 20 that may form, for example, an exterior panel (e.g., hood, door, quarter panel, etc.) for a vehicle. Panel assembly 20 includes a first or outer panel 28 and a second or interior panel 30. When panel assembly 20 is part of the vehicle, outer panel 28 will face the environment located exterior to the vehicle and inner panel 30 will face toward an interior of the vehicle. Outer panel 28 and interior panel 30 are joined together along an outer periphery of panel assembly 20 by a hem 32 where a first terminal end 34 of outer panel 28 is folded over a second terminal end 36 of inner panel 30 to form a flange 38 that sandwiches second terminal end 36 of inner panel 30 between outer panel 28 and first terminal end 34.

Again referring to FIG. 1, it can be seen that hemming die 22 includes a seat 40 that is configured to support outer panel 28 and inner panel 30. Seat 40 may include a shape and contour that matches the desired shape and contour of panel assembly 20 and, therefore, may be unique to the desired panel assembly 20 to be manufactured using hemming system 10. Hemming die 22 also includes a hemming bed 42 along an outer periphery 44 of hemming die 22 that can support the first and second terminal edges 34, 35 of the outer and inner panels 28, 30 during use of hemming system 10.

During operation of hemming system 10, robot 12 will move hemming roller attachment 24 and roller 26 based on instructions received from controller 18 along hemming bed 42 such that the first and second terminal edges 34, 35 of the outer and inner panels 28, 30 are sandwiched between the roller 26 and the hemming bed 42, and pressure is applied to first terminal edge 34 of the outer panel 28 to fold the first terminal edge 34 of the outer panel 28 over the second terminal edge 36 of the inner panel 30 and form flange 38 and create hem 32 that fixes outer panel 28 to inner panel 30 and complete panel assembly 20.

Figure 3:
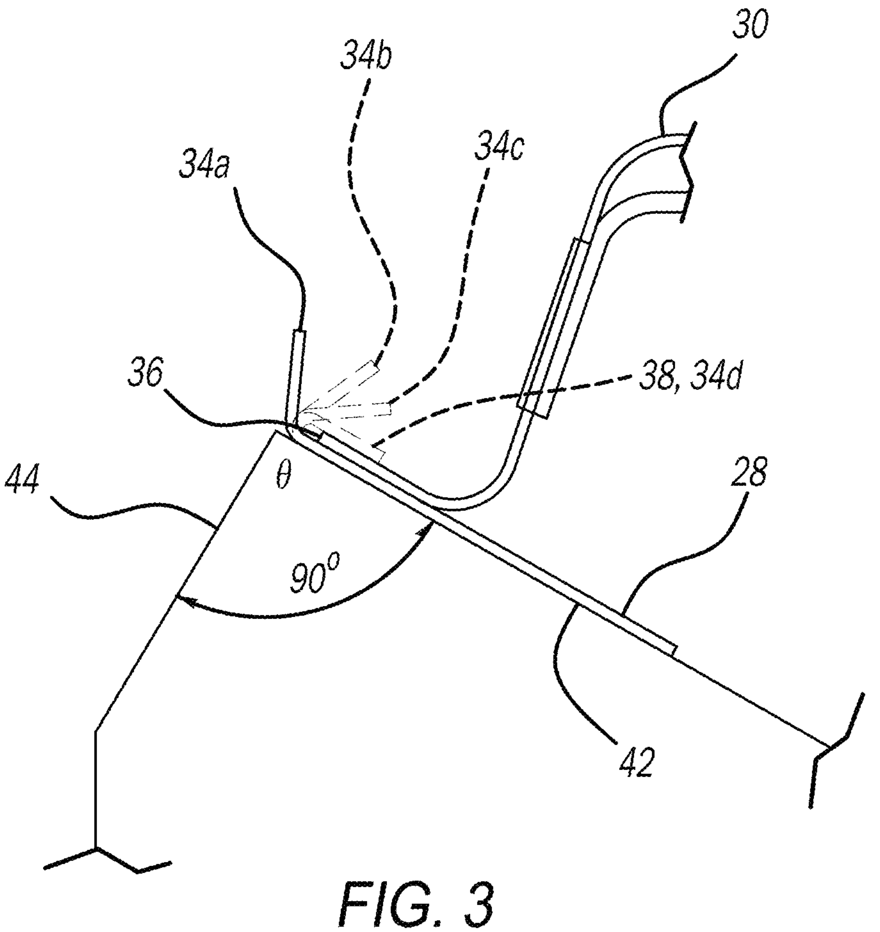
FIG. 3 Prior Art
FIG. 3 illustrates a conventional hemming die.
Figure 4:
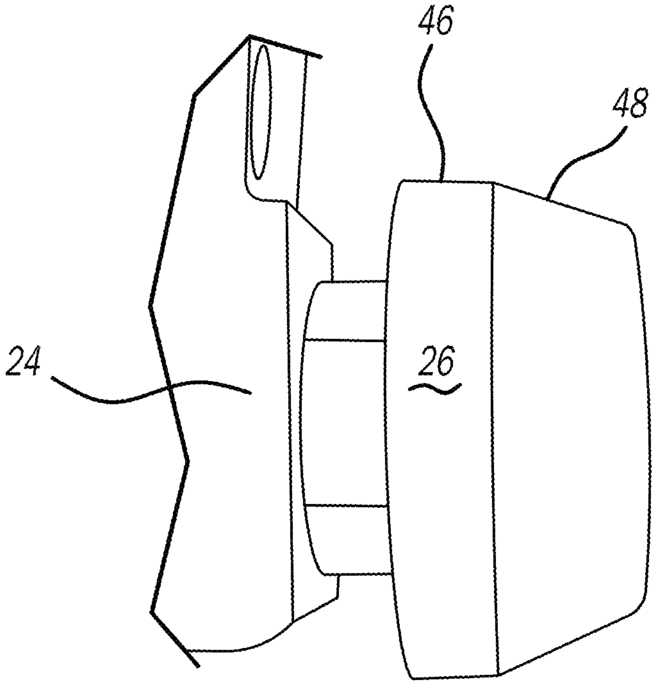
FIG. 4 illustrates an example roller of the example hemming system illustrated in FIG. 1.

As shown in FIG. 3, this process typically comprises a plurality of passes such that a first pass of roller 26 along hemming bed 42 results in moving first terminal end 34 from a first position **34*a* to a second position 34*b*, a second pass results in moving first terminal end 34 from the second position 34*b* to a third position 34*c*, and a third pass results in moving first terminal end 34 from the third position 34*c* to a final position 34*d* that results in formation of flange 38. As can also be seen in FIG. 3, an angle ⊖ between hemming bed 42 and the outer periphery 44 of hemming die 22 is about ninety degrees. This is significant because, as shown in FIG. 4, roller 26 is not necessarily entirely cylindrical in form. In contrast, roller 26 may include a cylindrical body 46 that radially narrows to define chamfered surfaces 48, with the chamfered surfaces 48 being configured to contact first terminal end 34 of outer panel 28 and move terminal end 34 through the positions 34*a* to 34*d*** as multiple passes are made.

Put another way, because the angle ⊖ between hemming bed 42 and outer periphery 44 of hemming die 22 is about ninety degrees, chamfered surface 48 is only designed to make contact first terminal end 34 of outer panel 28 during each of the passes and is not designed to make contact with hemming die 32 during the hemming process. This is undesirable from the standpoint that a sufficient amount of force cannot necessarily be applied to the first terminal end 34 of outer panel 28, at least during the first pass (i.e., moving first terminal end 34 from the first position **34*a* to the second position 34*b*) when folding first terminal end 34 over second terminal end 36 of inner panel 30** during each pass, which increases the likelihood of panel bending, wrinkling or external bending.

Figure 5:
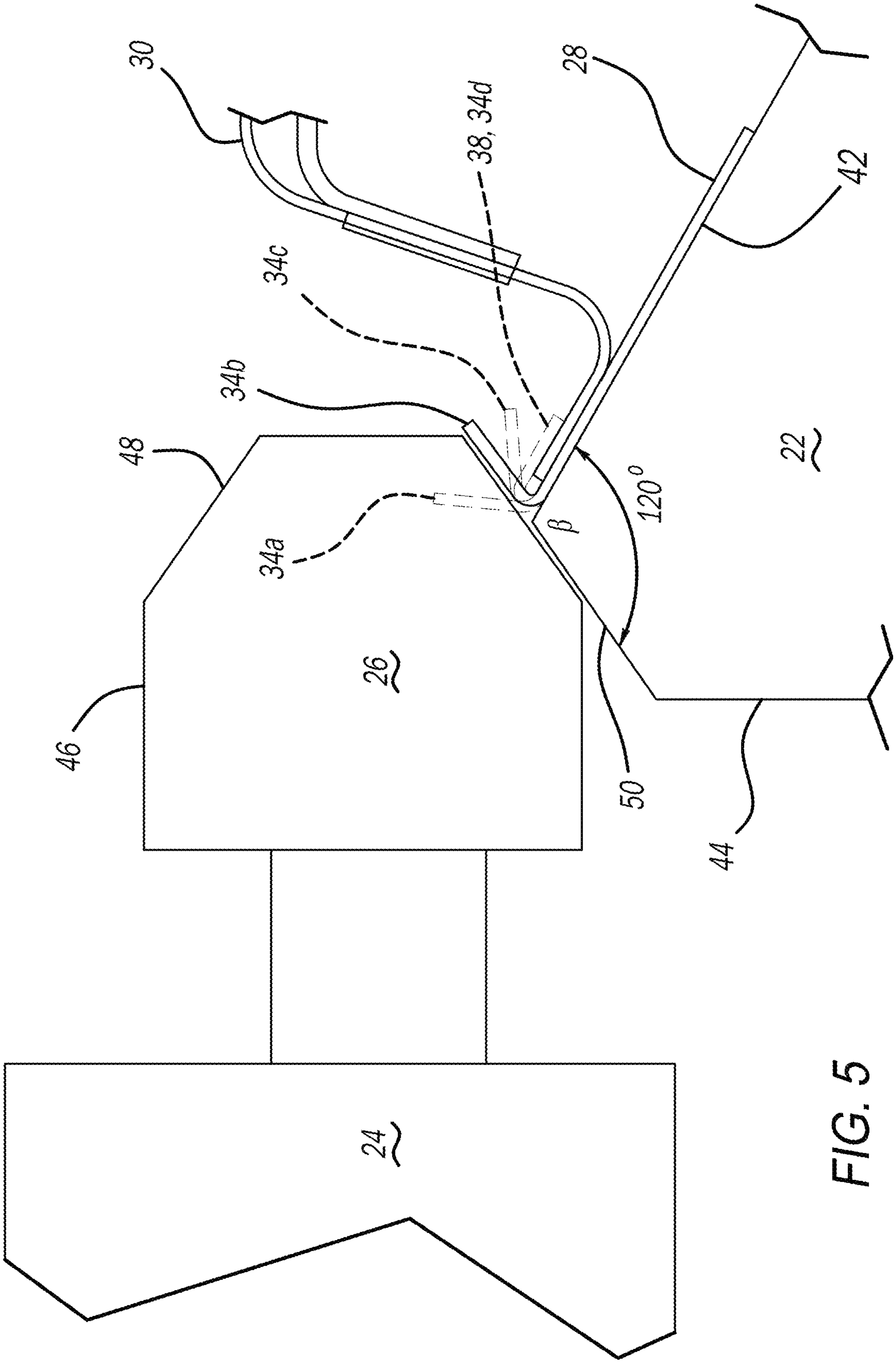
FIG. 5 illustrates a hemming die according to a principle of the present disclosure.

With the above in mind, and now referring to FIG. 5, the present disclosure provides a hemming system 10 having an improved hemming die 22. More particularly, rather than utilizing the angle ⊖ between hemming bed 42 and outer periphery 44 of hemming die 22 is about ninety degrees, the present disclosure provides a hemming die 22 that utilizes an angle β between hemming bed 42 and outer periphery 44 that lies in the range of about 110 degrees to 130 degrees, and is preferably about 120 degrees. By forming outer periphery 44 of hemming die 22 at the angle β relative to hemming bed 42, outer periphery 44 can function as a reference surface 50 upon which at least a portion of chamfered surface 48 may abut during at least the first pass of the hemming process that moves first terminal end 34 of outer panel from the first position **34*a* to the second position 34*b***.

As noted previously, the first pass of the hemming process is generally considered to be the most important in order to prevent wrinkles and/or cracks from being formed in the hem 32. Because chamfered surface 48 of roller 26 can be in contact with each of the reference surface 50 and the first terminal end 34 of the outer panel, movement of the roller 26 about hemming die 22 with the first and second terminal edges 34, 36 of the outer and inner panels 28, 30 are sandwiched between the roller 26 and the hemming bed 42 can be more strictly controlled, and the pressure that is applied to first terminal edge 34 of the outer panel 28 to fold the first terminal edge 34 of the outer panel 28 over the second terminal edge 36 of the inner panel 30, at least during the first pass of the hemming process, can be increased. By more strictly controlling the movement of roller 26 relative to the panel assembly 20, while also being able to apply a greater amount of pressure to the panel assembly 20, the occurrence of wrinkles and cracks in hem 32 can be eliminated or at least substantially minimized.

After conducting the first pass where chamfered surface 48 is at least partially abutted against reference surface 50, robot 12 may adjust the position of roller 26 relative to first terminal end 34 such that chamfered surface 48 only contacts the first terminal end 34 of the outer panel 28 and conduct the second pass of the hemming process. Notwithstanding, because the occurrence of wrinkles and cracks in first terminal end 34 of the outer panel 28 has been eliminated or at least substantially minimized during the first pass, contact between roller 26 and reference surface 50 may no longer be necessary when conducting the second and subsequent passes because, as noted above, the greatest risk of producing poor hem quality occurs during the first pass. What's more, the number of passes may be reduced because of the reliability that is achieved during the first pass. In this regard, roller 26 may be pressed against the first terminal end 34 of the outer panel 28 with an increased force in comparison to second passes that were conducted when hemming die 22 did not include the reference surface 50. In any event, no substantive "reworking" of the hem 32 may be required after conducting the hemming process to remove or mitigate the occurrence of imperfections inn the hem 32 in the panel assembly 20, which improves quality and reduces manufacturing time and costs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hemming apparatus comprising:

a robot having a hemming attachment including a roller attached thereto; and a hemming die including:

a seat configured to support a first panel and a second panel of a panel assembly relative to one another;

a hemming bed positioned between the seat and an outer periphery of the hemming die, the hemming bed configured to support a first terminal edge of the first panel and a second terminal edge of the second panel of the panel assembly relative to one another; and a reference surface between the hemming bed and outer periphery of the hemming die, wherein the robot is configured to move the roller about the outer periphery of the hemming die in a manner where the roller simultaneously contacts each of first terminal edge of the first panel and the reference surface to fold the first terminal edge of the first panel over the second terminal edge of the second panel to create a flange that secures the first panel to the second panel, the simultaneous contact between the roller and each of the reference surface and the first terminal edge of the first panel guides the roller relative to the first terminal edge of the first panel when folding the first terminal edge over the second terminal edge, and an angle between the hemming bed and the reference surface lies in a range of about 110 degrees to about 130 degrees.

2. The hemming apparatus according to claim 1, wherein the angle between the hemming bed and the reference surface lies is about 120 degrees.

3. The hemming apparatus according to claim 1, wherein the roller includes a cylindrical body having an end that radially narrows to form a chamfered surface.

4. The hemming apparatus according to claim 3, wherein the chamfered surface is configured to contact the reference surface.

* * * * *